United States Patent [19]

Carvelo

[11] 4,431,280

[45] Feb. 14, 1984

[54] PLANAR ROTATIONAL AUTOSTEREOSCOPIC DISPLAY

[76] Inventor: Lenard B. Carvelo, 481-E Kawailoa Rd., Kailua, Hi. 96734

[21] Appl. No.: 324,600

[22] Filed: Nov. 24, 1981

[51] Int. Cl.$^3$ .............................................. G03B 35/00
[52] U.S. Cl. ....................................... 352/58; 352/61; 353/7
[58] Field of Search ........................ 352/61, 58; 353/7

[56] References Cited

U.S. PATENT DOCUMENTS

| | | |
|---|---|---|
| 725,567 | 4/1903 | Ives . |
| 2,401,173 | 5/1946 | Matthews . |
| 2,421,393 | 6/1947 | Savoye . |
| 2,441,674 | 5/1948 | Savoye . |
| 3,324,760 | 6/1967 | Collender ............................. 352/61 |
| 3,815,979 | 6/1974 | Collender ............................. 352/58 |
| 4,089,597 | 5/1978 | Collender ............................. 352/58 |
| 4,176,923 | 12/1979 | Collender ............................. 352/58 |
| 4,231,642 | 11/1980 | Collender ............................. 352/58 |
| 4,349,252 | 9/1982 | Collender ............................. 352/58 |

OTHER PUBLICATIONS

*Lipton on Film Making,* Simon & Schuster, 1959, Lenny Lipton, pp. 128-132.
Spie. vol. 120, pp. 184-191, Three-Dimensional Imaging (1977).
Spie, vol. 199, Advances in Display Technology, pp. 42-46, (1979).
JSMPTE, Jul. 1971, vol. 80, Principles of Binocular 3D Displays with Applications to Television, pp. 539-544.
JSMPTE, vol. 59, Jul. 1952, Theory of Parallax Barriers, pp. 11-21.
Omni Magazine, May. 1981, vol. 3, No. 8, *3-D Machine,* p. 49.
IRE International Conv. Rec. PT. 3, 1962, *Practical Solid State Three Dimensional (3-D) Display,* pp. 177-184.

*Primary Examiner*—Monroe H. Hayes

[57] ABSTRACT

This invention is an improved synchronized autostereoscopic display device whereby luminous images originating from any transmittance media capable of pictoral image display are both projected from separate fixed positions, each originating from its respective barrier grid cylinder, which said images are gathered by an optical assembly and conveyed by a rotating mirror assembly to a rear-view screen. This vertical picture plane rotates horizontally at high speed enabling each observer the reception of an autostereoscopic image when a complete left and right eye image is viewed by each appropriate eye at interocular distance through a spinning synchronized image separating barrier.

The invention provides full freedom and choice of seating arrangement within a volumetric audience viewing zone which is perceptually devoid of psuedoscopy.

Repetitive sequential autostereoscopic viewing zones are selectively projected within an audience volume by each rotational picture interaction with one of three predetermined image separating barrier portions which vary the observer viewing distances.

1 Claim, 11 Drawing Figures

PLANAR ROTATIONAL AUTOSTEREOSCOPIC DISPLAY

FIELD OF INVENTION

The invention relates to the field of stereoscopic projectors which provides image separation by utilization of a synchronized viewing device.

BACKGROUND OF THE INVENTION

Prior-art of related stereoscopic projectors (which provides stereoscopy with static and moving bar grid barriers) creates psuedoscopic and stereoscopic viewing zones which are an inseparable bi-product of said barriers. Furthermore, psuedoscopy occurs in these presentations when the left eye receives the right eye image and while the right eye receives the image intended for the left eye.

The term psuedoscopy refers to an inverse stereo presentation whereby the background objects are perceived to be in the foreground and the foreground objects are perceived in said background, resulting in a reversal of normal depth perceived.

Common seating practices in moving barrier grid systems are designed to place the observer's chair where the appropriate stereoscopic zones are located and avoid altogether the psuedoscopic viewing zones.

IVES U.S. Pat. No. 725,567 illustrates a stereoscopic presentation with viewing limitations, whereby the stereoscopic picture requires the observer to place the left and right eye in the appropriate predetermined area or zone and must restrict head movement horizontally; otherwise psuedoscopy occurs. It is geometrically impossible to produce a vertical static barrier grid of one set bar width which satisfies multiple observers at different viewing distances and locations simultaneously.

The double-slotted shutter of MATTHEWS (U.S. Pat. No. 2,401,173) depends solely on a baffle viewing screen to effect a limited stereoscopic presentation which provides a few useful rows of spectator seats.

The invention of SAVOYE (U.S. Pat. No. 2,421,393) illustrates the necessary parallel alignment of the cylinder grid bars with the audience viewing plane to provide even stereoscopic distribution horizontally. To effect a vertical seating plane arrangement would not be possible with the invention as depicted.

The improvement in U.S. Pat. No. 2,441,674 by SAVOYE utilizes an inclined frustral cone to effect an inclined viewing plane which provides stereoscopic viewing with a selective radial seating arrangement. This invention, as depicted, cannot provide stereoscopy with a seating arrangement on a flat horizontal plane.

HESS's invention (British Pat. No. 13,034) is a lenticular screen comprising vertical cylindrical lenses. Although this invention allows greater image illumination, stereoscopic and psuedoscopic viewing zones are produced in the volumetric audience space. This system possesses stereo projection characteristics which are similar to SAVOYE, et al.

Establishing a stereoscopic viewing environment at home on the parlor floor with inventions of prior art may prove to be difficult and particularly inconvenient since psuedoscopic and stereoscopic viewing zones are present. The observers have no freedom or choice of seating arrangement when they must visually avoid psuedoscopic viewing zones, therefore elimination of said zones is desirable.

In addition, a recent rediscovery of a seemingly new 3-D volumetric display has been publicly disclosed. This 3-D presentation utilizes light emitting diode arrays that are affixed to a flat two dimensional surface which spins on a vertical axis. A computer activates certain light emitting diodes during a 180 degrees rotational interval of the diode viewing surface wherein points of light are emitted in a spacial volume contained by the spinning screen's outer perimeter to obtain a seemingly solid image of geometric objects. The volumetric display as stated cannot portray a geometric object against a flat background, nor can it present a greater impression of visual depth by geometric objects situated beyond the display's spinning perimeter; instead it requires 180 degrees of rotation to construct a perceptual impression of solidity. This particular display system is a depth limited display.

SUMMARY OF THE INVENTION

This autostereoscopic display of my invention provides each depth perceptive observer in the audience volume with an autostereoscopic picture image projected at interocular distance within a wider continuous autostereoscopic viewing zone fronting said display so that observers possess full freedom of seating arrangement in said zone which is perceptually devoid of psuedoscopy.

A horizontal rotating vertical picture plane utilizing a translucent rear-view screen systematically produces timed autostereoscopic images by only a small amount in degrees of rotational arc of said screen. The screen rotates 360 degrees continuously at high speed consistent with human persistence of vision providing the audience volume with an autostereoscopic presentation.

Upon a slow motion analysis, the images are perceived to be most bright in the audience volume at the instant of the viewing screen's perpendicular alignment with the eyes of an observer. As the screen continues to rotate, drastic light fall-off occurs and there is no further perception of images on said screen until it has rotated 360 degrees to its viewing origin.

SOME OBJECTIVES OF THE INVENTION

A most important objective of this invention is to provide a visual autostereoscopic display for the field of visual communication: television, video games, radiology and motion picture arts and sciences.

The main objective of this invention is to provide a visual autostereoscopic display with depth perception which systematically produces an autostereoscopic viewing zone which is perceptually devoid of psuedoscopy.

Another further objective is to provide a visual autostereoscopic display with depth perception that does not require the wearing of viewing spectacles to accomplish an autostereoscopic presentation.

Another important objective of this invention is to provide a visual autostereoscopic display which will enhance the realism of image information through illusiory autostereoscopic representation of true three dimensional objects.

Still another objective of this invention is to provide an autostereoscopic presentation upon observers situated over a greater lateral viewing zone.

Other objectives and features of this invention will become apparent in the following description and drawings.

DESCRIPTION OF THE PREFERRED EMBODIMENTS

Figure 1:
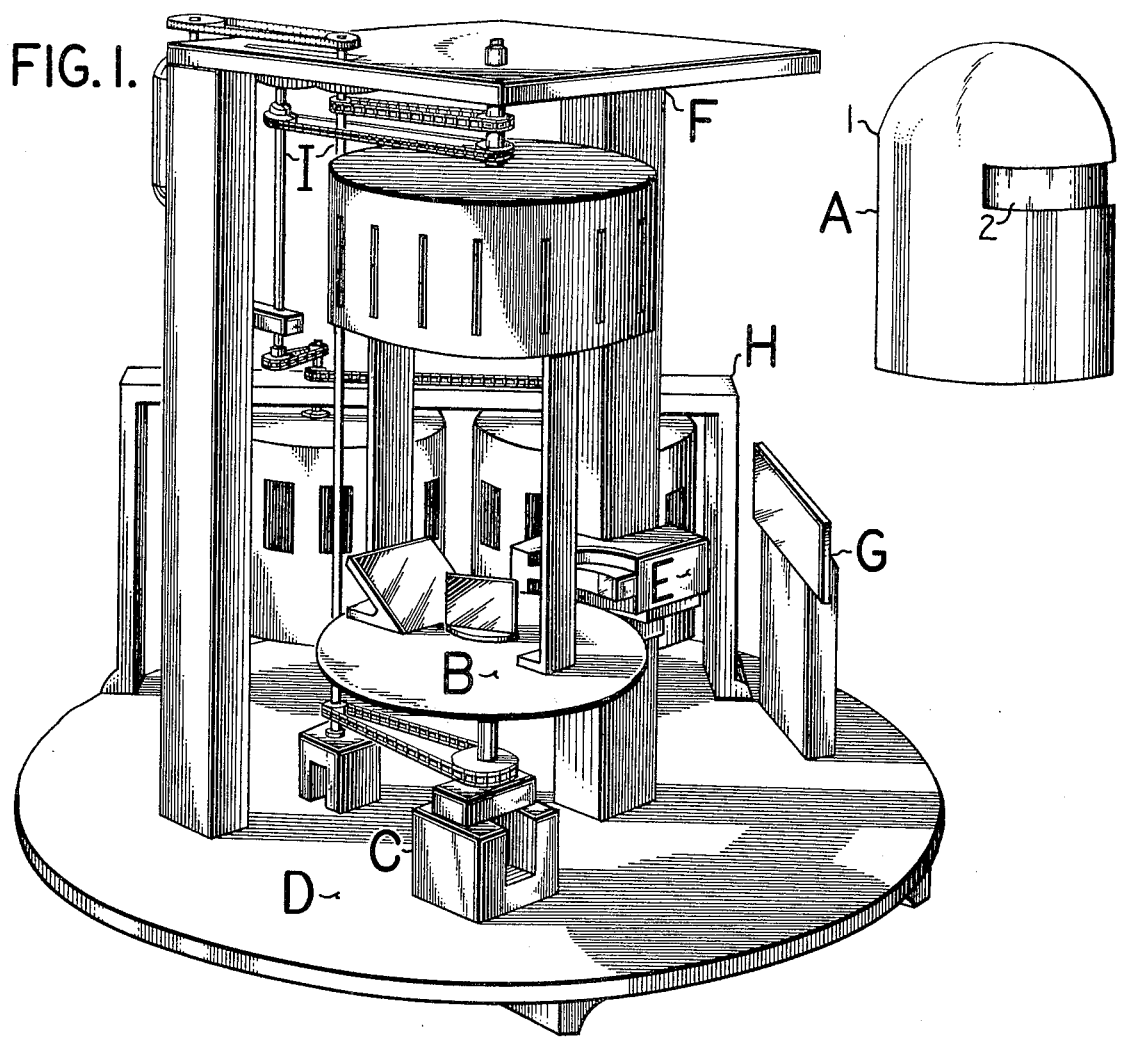
FIG. 1 is a perspective over-view of the invention with Outer Housing A removed to disclose the general relationship and positioning of various sub-assemblies of said invention.

The phraseology or terminology employed herein is for the purpose of description and not limitation. The invention is separated into sub-assemblies assigned a general descriptive title followed by an alphabetical letter to facilitate easier discussion of the invention's features and related components. Reference numerals and letters appear in the selected drawings. The method of fastening the depicted parts of the invention are not shown; any suitable means of fastening are acceptable such as by glueing, bolting, riveting and others.

FIG. 1 discloses Outer-Housing A comprising dome 1 and window 2. Outer-Housing A which is hollow, covers the mechanical parts of the invention, said housing is later positioned onto the outer perimeter of Base D. The relative positions of Drum Assembly B, Platform C, Base D, Optical Assembly E, Drum Support F, Mirror Assembly G, Barrier Unit H and Gear Assembly I are depicted.

Figure 2:
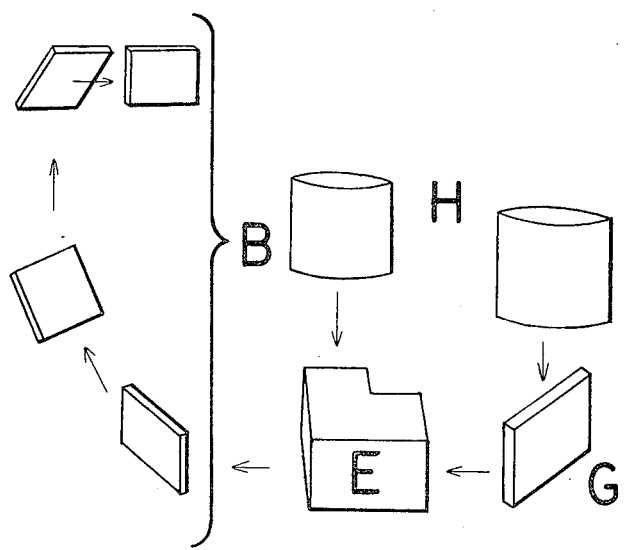
FIG. 2 is a simplified view of the invention's projection path.

FIG. 2 shows the Barrier Unit H left and right image cylinders which transmit luminous images to Optical Assembly E wherein said images are received by Drum Assembly B with its mirror array and rear-view screen.

Figure 3:
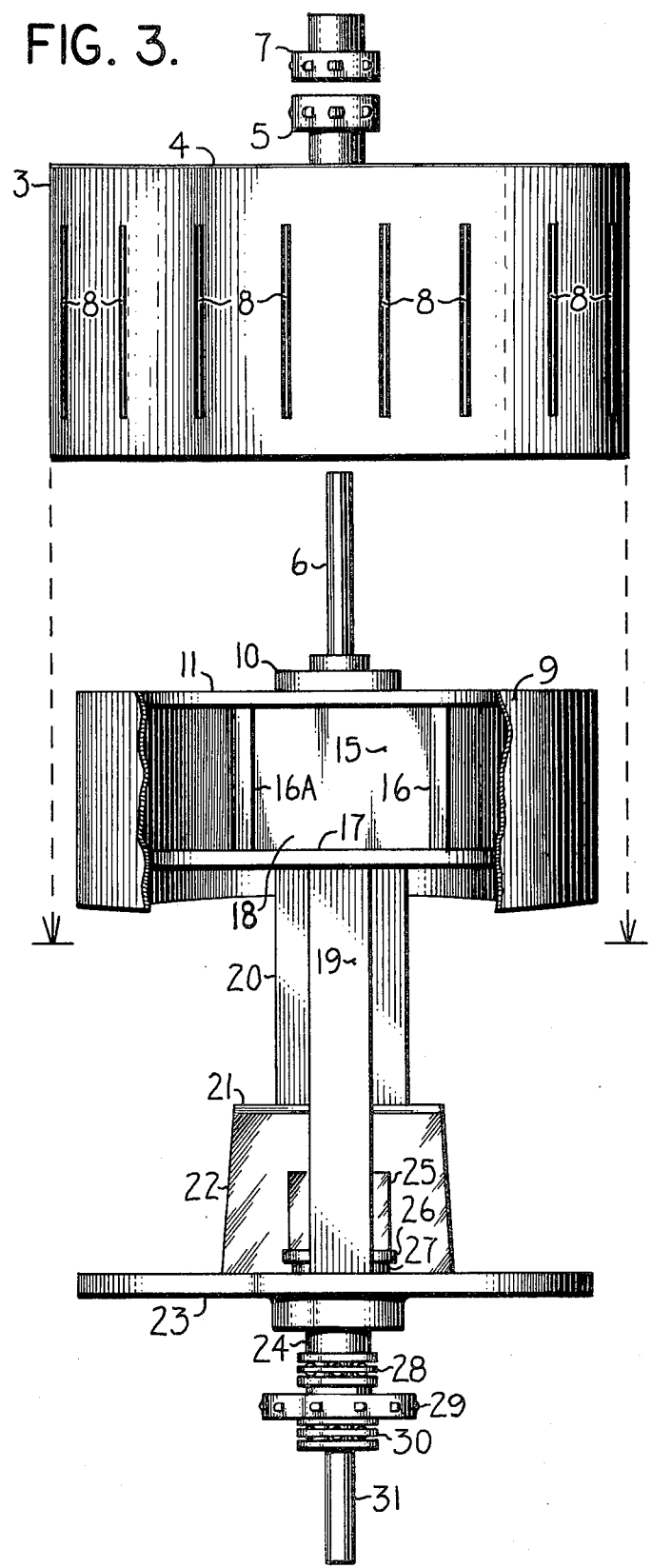
FIG. 3 is a front view of Drum Assembly B wherein the viewing barrier has been lifted to reveal a hidden part. Also, partial removal of a covering allows visual access to a hidden part.
Figure 4:
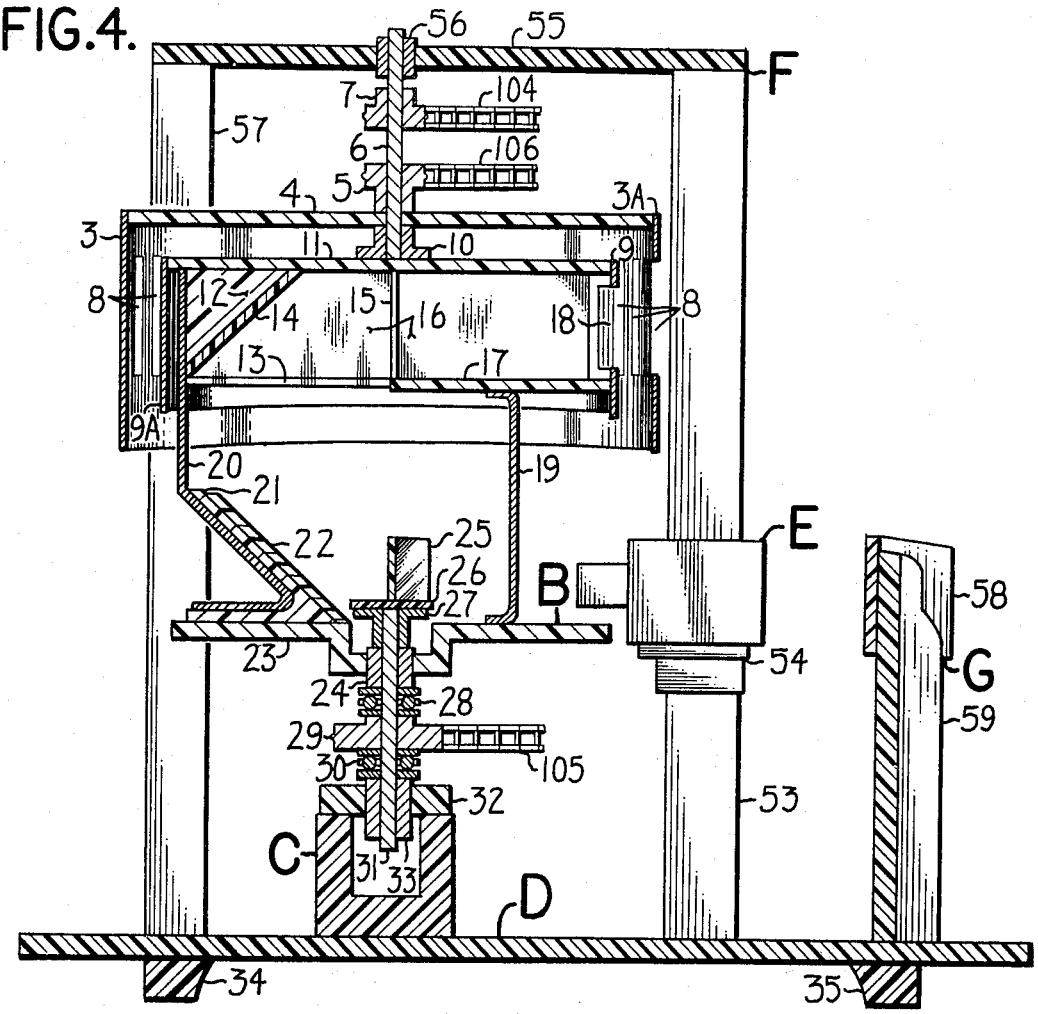
FIG. 4 is a sectional view of the sub-assembly portions designated as Drum Assembly B, Platform C, Case D and Mirror Assembly G. Optical Assembly E is not sectioned here and Drum Support F is only partially sectioned. Also, Drum Assembly B is turned 90 degrees to better disclose its interior.

FIG. 3 reveals the location of partition 16A in Drum Assembly B and other reference numerals depicted here may be reviewed after reading FIG. 4.

In FIG. 4 Drum Assembly B comprises the following; barrier covering 3, (3A is a continuation of 3), disk 4 and sprocket 5 are fastened together forming a viewing barrier. Shaft 6 is fastened to sprocket 7. Shaft 6 is not fastened to sprocket 5. Openings 8 are located on covering 3. Covering 9, (9A is a continuation of 9), disk coupling 10, disk 11 and mirror support 12 are fastened. Opening 13 allows reflected images to be received by mirror 14 wherein said mirror is glued to mirror support 12. Screen 15, partition 16, including (16A not shown here) and disk 17 are fastened so that opening 18 on covering 9 provides a means of visual access to screen 15. Disk support 19, support stand 20, mirror support 21, mirror 22, disk base 23 and disk bearing 24 are fastened in the arrangement depicted.

Finally, mirror 25, mirror support 26, coupling 27, top thrust bearing 28, sprocket 29, bottom thrust bearing 30 and shaft 31 are secured so that shaft 31 is fastened to coupling 27 and sprocket 29, whereby thrust bearings 28 and 30 provide the easy rotation of Drum Assembly B.

Platform C includes bearing support 32 and platform bearing 33. Platform C is secured to Base D. Right leg 34 and left leg 35 are secured to Base D.

Figure 5:
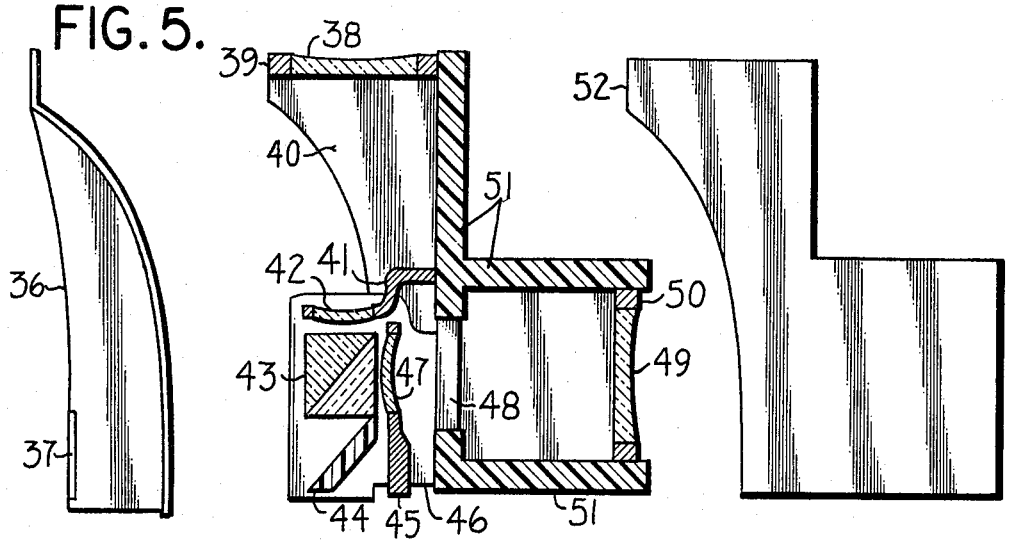
FIG. 5 is a top sectional view of Optical Assembly E wherein two covers are removed and are not sectioned.

Referring to FIG. 5 Optical Assembly E comprising side cover 36 with window 37 glued thereon, plano-concave lens 38, support frame 39, main optical base 40, lens holder 41, meniscus lens 42, beam splitter 43, mirror 44, lens holder 45, optical platform 46, meniscuus lens 47, opening 48, plano-concave lens 49, support frame 50 and walls 51 are fastened in the arrangement depicted. Top cover 52 is secured to walls 51 and positioned in the same perimetric alignment as main optical base 40. Side cover 36 which protects the optical elements is placed against base 40 and top cover 52 and fastened thereto. Opening 48 allows image transmittance from lens 49 to lens 47.

In FIG. 4 Drum Support F comprises left support 53, assembly support 54, top plate 55, plate bearing 56 and right support 57 are fastened together. Supports 53 and 57 are secured to Base D. Shaft 6 is positioned through plate bearing 56.

Mirror Assembly G comprises mirror 58 which is fastened to support 59 whereby said assembly is secured to Base D. Mirror 58 receives and reflects an image transmittance originating from inside a barrier grid cylinder to Optical Assembly E.

Figure 6:
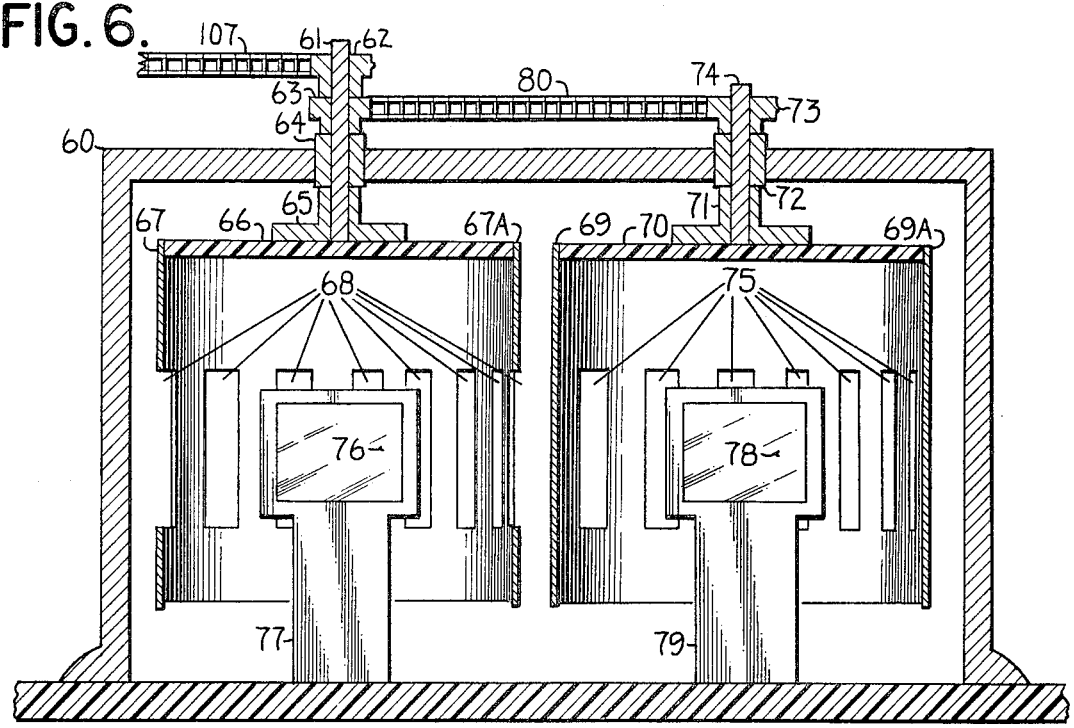
FIG. 6 is a sectional view of Barrier Unit H revealing image area supports.

FIG. 6 depicts Barrier Unit H comprising support hanger 60, shaft 61, sprocket 62, sprocket 63, bearing 64, coupling 65, disk 66 and cover 67, (67A is a continuation of 67) are fastened together to form a barrier grid cylinder. Openings 68 are located on covering 67.

Also disclosed, covering 69, (covering 69A is a continuation of 69), disk 70, coupling 71, bearing 72, sprocket 73 and shaft 74 are fastened together. Openings 75 are located on covering 69.

Left picture image area 76 is framed by support 77 and right picture image area 78 is framed by support 79. Image areas 76 and 78 may contain one of the following illuminated display surfaces; photographic celluloid, cathode ray tube, diode light array, liquid crystal display, holographic film and other systems of pictoral display, retention and generation. These image areas can be in color, black and white, positive or negative, or in a combination thereof. Furthermore, image areas 76 and 78 may be either still or moving.

Cylinder chain 80 is connected to sprocket 63 and sprocket 73, said chain provides synchronization for both rotating barrier grid cylinders.

The following parts, barrier covering 3, covering 9, disk 11, disk 17, partitions 16 and 16A, covering 67 and covering 69 are painted flat black to minimize any extraneous light reflections on said parts wherein a better viewing presentation is effected.

Figure 7:
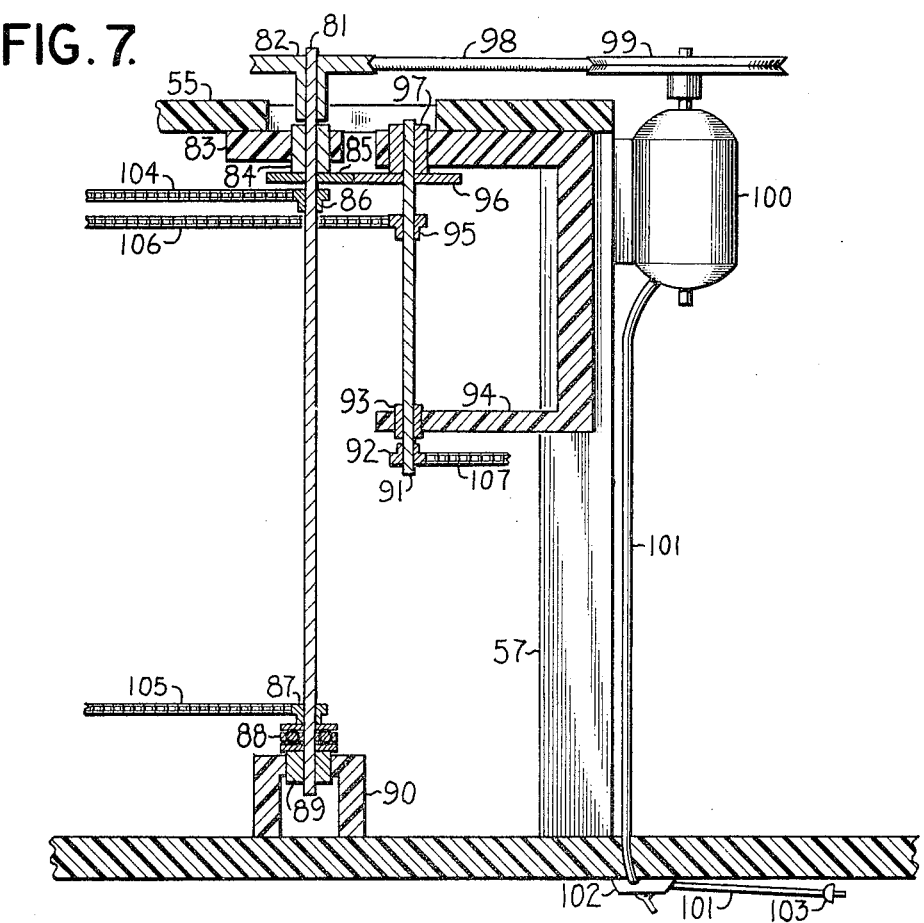
FIG. 7 is a sectional side view of Gear Assembly I.

Referring to FIG. 7, Gear Assembly I includes main shaft 81, main sheave 82, bearing support 83, upper main bearing 84, spur gear 85, drive sprocket 86, mirror drive sprocket 87, main thrust bearing 88, lower main bearing 89 and bearing support 90 are fastened together in the arrangement of parts depicted.

Included also, secondary shaft 91, cylinder drive sprocket 92, lower secondary bearing 93, bearing holder 94, barrier drive sprocket 95, spur gear 96 and upper secondary bearing 97 are fastened.

Finally, belt 98 is connected to sheave 99 and main sheave 82, so that motor 100 provides a means to rotate the various associated members of the invention. Wire 101 connects motor 100 to switch 102 and plug 103. Plug 103 is connected to a voltage supply (not shown).

Operation of the invention is as follows. Rotation of Drum Assembly B is effected by sprocket 7, drum drive chain 104, drive sprocket 86, main shaft 81 and motor 100, said shaft also effects sprocket 29, mirror drive chain 105 and mirror drive sprocket 87. All sprockets mentioned have the same number of teeth, however with the exclusion of sprocket 29 which has twice said number of teeth.

Barrier drive chain 106 and cylinder drive chain 107 provides same equal rotational synchronization for barrier covering 3 and Barrier Unit H cylinders.

Mirror 25 of Drum Assembly B rotates 180 degrees of arc per each 360 degrees of rotational arc of said assembly, said mirror being operatively timed in the same rotational direction of said assembly so that left and right images from Optical Assembly E are reflected by said mirror to mirrors 22 and 14 whereby a plural image registration occurs on screen 15 during the rotational viewing presentation. Moreover, mirror 25 is silvered on both flat sides of it. The first surface mirrors disclosed herein are made of light weight durable plastic. Drum Assembly B rotates at about 2,880 revolutions per minute. Also, to reduce rotational vibration of Drum Assembly B at high speeds, said Assembly must be balanced and any suitable means of accomplishing this is acceptable.

The cylinders in Barrier Unit H are positioned so that openings 75 said openings 68 are intercalated if imagining the two cylinders superimposed on each other; this alignment provides a matte and counter-matte system whereby picture image areas 76 and 78 are sectioned by vertical bar strips of image elements occurring when both barrier coverings traverse the face of said image areas. Image areas 76 and 78 are placed as close as possible to the inner perimeter of its corresponding cylinder without its support touching said cylinders. Intercalation of right and left images occur when beam splitter 43 combines the gathered image transmittance at Barrier Unit H so that screen 15 possesses consecutive pairs consisting of right and left image bar strip elements that are moving during projection across said screen. The size of image areas 76 and 78 are projected approximately proportional to the size of screen 15.

In Gear Assembly I, a gearing ratio is established with shafts 81 and 91 whereby a third portion of barrier covering 3 is traverse against the rotational direction of screen 15. Furthermore, although a gearing ratio is employed in the invention, other methods of ratio utilization means are also possible such as direct drive motors, variable voltage motors, and direct drive gears.

Finally, the interocular separation of left and right images are created by covering 3 and openings 8 which provides a difocal curviplanar viewing plane in the audience volume.

The term difocal refers to the distance from screen 15 to the observers eyes whereby two interocular points (di) occurring on a curved viewing plane caused by the spacing of openings 8 are of equal (focal) distance so that a complete left and right eye image can be seen by each appropriate eye on said difocal points.

The term curviplanar refers to a combination of two words, curvia combining form meaning curved, bent, as in curvilinear and planar-pertaining to a plane, therefore said term means pertaining to a curved plane.

Figure 8:
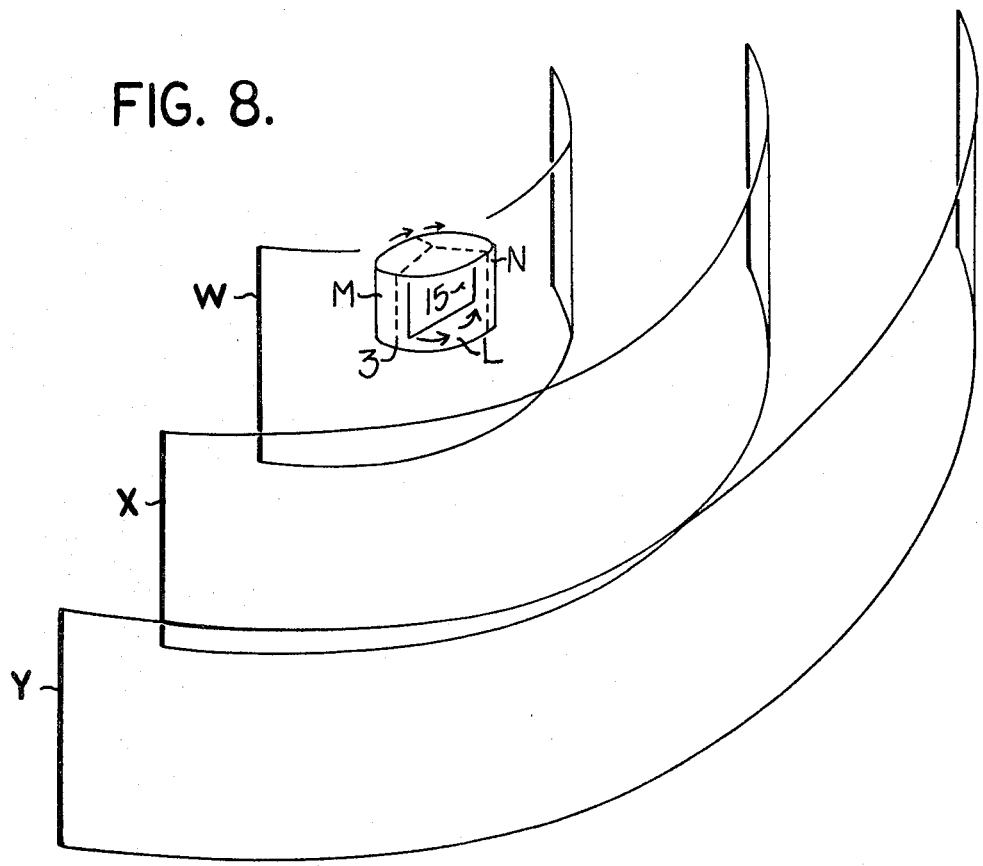
FIG. 8 is a diagrammatic illustration showing how the invention provides three curviplanar projections in a three dimensional audience volume.

In FIG. 8, three curviplanar dimensions are illustrated as W, X and Y wherein each of the curved plane areas possess possible difocal observation points as determined by each third portion of covering 3 designated as portions L, M and N, said portions containing different openings 8 to provide a different difocal distance. (Opening 8 not shown here).

The plural image transmittance by Drum Assembly B's screen 15 is continuously operative within a 90 degree rotational arc of said assembly, and a 90 degree viewing zone represented by W, X and Y planes is located in the audience volume so that a wider lateral viewing area occurs throughout said volume whereby multiple observers possess complete freedom and choice of seating arrangement. The rotation of screen 15 provides an autostereoscopic presentation within the curved plane of W; as said screen turns away from the viewing audience, another third portion of covering 3 is being positioned to provide curved plane X. Each rotational autostereoscopic presentation corresponds to one curviplanar viewing plane at a time. The first rotation of 15 will produce curved plane W utilizing portion L. The second rotation of 15 will produce dimensions X utilizing portion M and the third rotation of 15 will create dimensions Y by portion N. The fourth rotation of screen 15 will repeat curved plane W so that alternating curviplanar viewing planes are rapidly placed and displaced in the audience volume.

Figure 9:
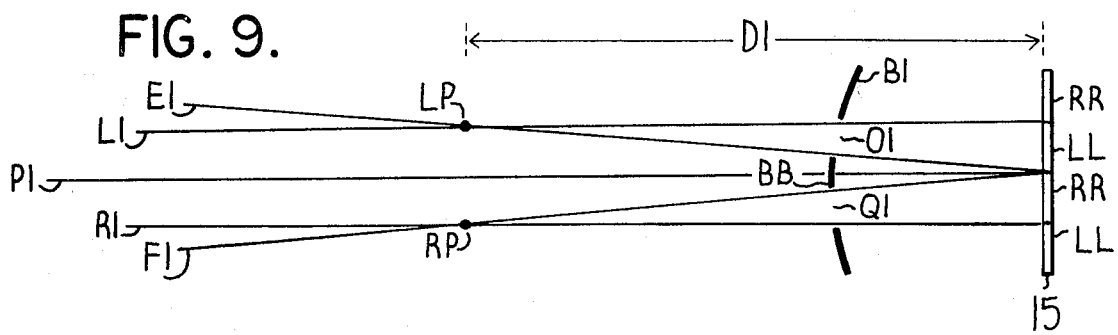
FIG. 9 is a diagram and method for calculation of difocal distance as it relates to the barrier bar width and its openings.

Referring to FIG. 9, difocal distances can be calculated and created in the following manner: Line P1 is perpendicular to center of screen 15. Left and right eye lines L1 and R1 are depicted parallel to P1. D1 is chosen as the difocal viewing distance, when convergence lines E1 and F1 intersect lines L1 and R1 at LP and RP eye convergence points and said convergence lines intersect P1 at center of screen 15. The spacing depicted as BB is a proper barrier bar width to create a difocal distance depicted as D1, if barrier B1 possesses the same open spaces in width as BB, represented further by O1 and Q1 openings. Left image strip elements LL and right image strip elements RR becomes the proper width which must be replicated by Barrier Unit H to insure the proper geometry needed to provide the correct viewing distance as depicted. The method described above may be used to calculate any desired distances.

Figure 10:
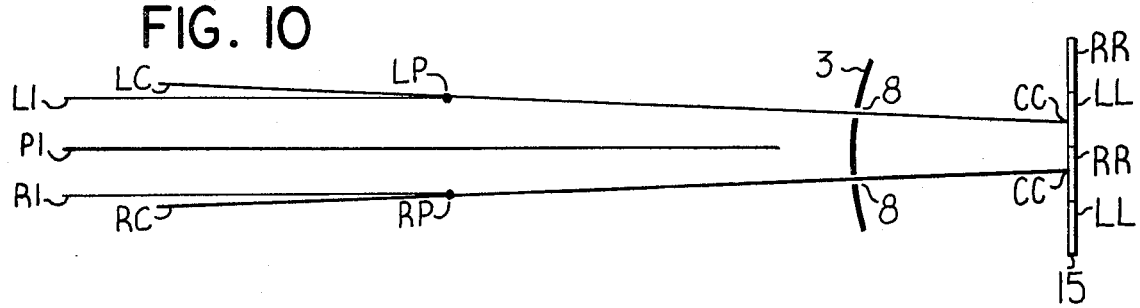
FIG. 10 diagrammatically discloses the geometric alignment for proper image separation.

In FIG. 10 proper image separation occurs when line LC intersects left eye line L1 at left eye point LP and said LC is centered through opening 8 on covering 3 and at image strip center CC on left image strip element LL. Also, line RC intersects right eye line R1 at right eye convergence point RP and said RC is centered through opening 8 and at image strip center CC on right image strip element RR on screen 15 and P1 is perpendicular to said screen. Openings 8 are approximately one third smaller than the openings depicted as O1 and Q1 in FIG. 9.

Figure 11:
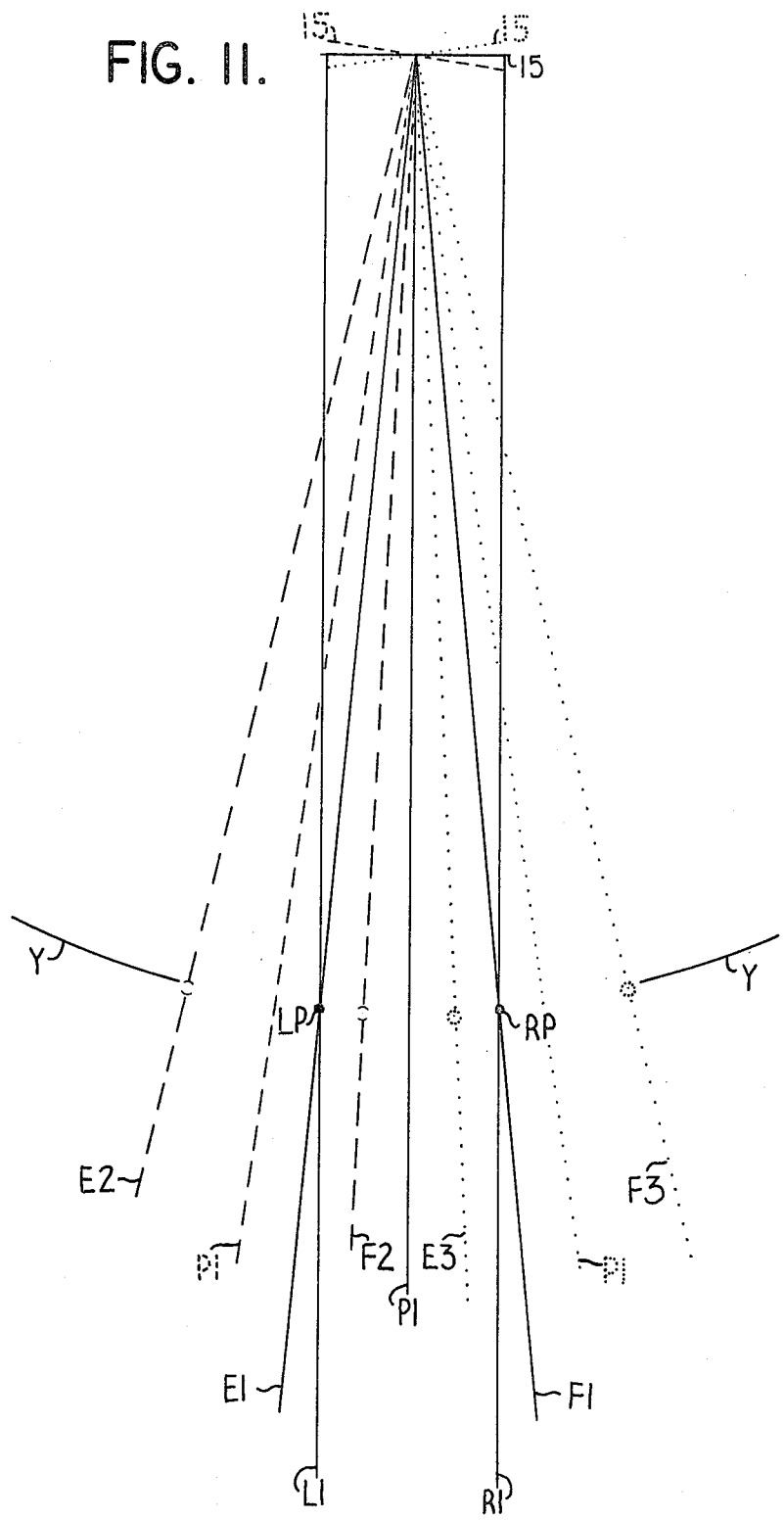
FIG. 11 is a top diagrammatical view illustrating how the invention systematically avoids a psuedoscopic presentation.

Disclosed in FIG. 11 is the method employed to systematically avoid a psuedoscopic presentation. The observer's eyes are located at LP and RP difocal convergence points which are situated on the furthest curviplanar viewing plane in the audience volume. The rotational image transmittance to the audience volume by Drum Assembly B's screen 15 is autostereoscopic being that the beginning image transmittance sequence by dashed right eye convergence line F2 is located at leaft half the measured distance between L1 and P1 boundaries, said F2 being in visual state of said transmittance from between said boundaries to and throughout boundaries P1 to R1 at right eye convergence point RP inclusive so that a psuedoscopic presentation is systematically avoided.

The beginning rotational image transmittance sequence at F2 cannot provide a complete coherent image structure to the left eye at LP and both eyes on curved plane Y at LP and RP are subjected to images which are barely perceivable by said eyes during said transmittance position. The optimum autostereoscopic image transmittance occurs when perpendicular P1 is centered between the eyes of an observer and during the timed interval when barrier covering 3 and screen 15 are in register, wherein all left and right eye convergence lines to said screen will present a complete left eye and right eye image to the observer. Dotted convergence lines E3 and F3 signify the end of the transmittance sequence. Right eye image transmittance is operative from F2 to F3 and the left eye image transmittance is operative from E2 to E3 whereby screen 15 possesses a rotational angle of arc by only approximately 16 degrees during said transmittance. Longer difocal curviplanar viewing distances will require screen 15 to retain images within the parameters employed in FIG. 11, said distances will reduce the amount of rotational arc of said screen.

The fine grain matte surface of screen 15 provides proper image transmittance when said screen is translucent. Longer viewing distances will require a change in the selection of the matte surface so that the screen can transmit images within a predetermined rotational arc for viewing presentation.

A simplistic way to accomplish the desired transmittance can be implemented by first, removing covering 3 and then rotate Drum Assembly B by hand to observe the amount of rotational arc of said assembly required for screen 15 to retain images. By careful observation, a correct matte screen can be selected so that Drum Assembly B systematically transmits autostereoscopic images by only the required amount of rotational arc as calculated within the parameters of FIG. 11. The selection of the granularity of the screen's fine grain surface is important in retention of images on it, as finer grain screens will be suited for longer viewing distances. Also, a further alternative to control image transmittance without a change in the screen's granularity is to lightly coat it with a clear mineral oil to increase said transmittance through it if desired.

In retrospect, Drum Assembly B provides one pair of images by the rotation of covering 3 and openings 8, said pair being continuously visually operative within a viewing zone by means of a translucent screen which retains images within a predetermined amount of rotational arc of said screen rotation so that each eye of an observer receives its proper corresponding image wherein a psuedoscopic impression is avoided.

To conclude, the invention is not limited in application to the details of construction and arrangement of parts illustrated in the accompanied drawings, since other embodiments of the invention are capable of being carried out in various ways. The barrier covering 3 for example, may be constructed considerably larger and the invention is capable of creating two curviplanar viewing planes with other gear ratio means and is also capable of utilizing one curviplanar viewing plane. Other barrier covering 3 means are possible such as a solid state liquid crystal approach to creating the moving bar grid patterns instead of having mechanical rotating barriers. Elimination of the rotating barriers is also possible by a screen means which channels the appropriate images to each eye and said screen means may be front projected with minor rearrangement.

I claim:

1. The synchronized autostereoscopic display apparatus comprising:
    (a) first and second image means, said first image means comprising a left eye image means surrounded by a first rotatable bar grid barrier means and second second image means comprising a right eye image means surrounded by a second rotatable bar grid barrier means;
    (b) a rotatable drum assembly;
    (c) a first rotatable mirror located substantially on the rotational axis of said axis of said drum assembly; said drum assembly comprising a second mirror for receiving the image reflected from said first rotatable mirror and reflecting said image in a direction parallel to the axis of said drum assembly, and a third mirror for receiving the image from said second mirror and directing said image is a direction toward the axis of said drum assembly;
    (d) a screen means mounted substantially on the axis of said drum assembly for receiving said image reflected from said third mirror; said screen means comprising a part of said drum assembly;
    (e) optical means for projecting the images from said first image means and said second image means onto said first rotatable mirror;
    (f) third rotatable bar grid means surrounding said drum assembly at a level corresponding with the level of said screen means; and
    (g) drive means for driving said first rotatable mirror at a speed sufficient to maintain persistence of vision between successive rotations and for driving said drum assembly and said first, second, and third rotatable bar grid means at twice the speed of said first rotatable mirror.

* * * * *